Patented June 26, 1945

2,379,104

UNITED STATES PATENT OFFICE 2,379,104

MANUFACTURE OF ESTERS

Alexander Miller Roberts, Widnes, England, assignor to Imperial Chemical Industries Limited, a corporation of Great Britain No Drawing. Application May 22, 1942, Serial No. 444,146. In Great Britain July 25, 1941

12 Claims. (Cl. 260—486)

This invention relates to improvements in the manufacture of organic esters, and more particularly to the manufacture of the lower alkyl esters of alpha-chloroacrylic acid.

In British Specification No. 514,619 there is described a method of manufacture of alpha-chloroacrylic acid and functional derivatives thereof, by reacting formaldehyde or a polymer thereof with trichloroethylene in the presence of sulphuric acid of at least 80% concentration, and subsequently heating the reaction mixture to a temperature of at least 80° C., and preferably at least 120° C., in the presence of water and/or an alcohol, the amount of water being less than 1.5 times, and preferably less than 1.0 times the weight of the 100% sulphuric acid. In an example of the process showing the manufacture of the acid using formalin as the source of formaldehyde, a small amount of the methyl ester was obtained which was stated to be formed from the methanol present in the grade of formalin used.

According to the present invention lower alkyl esters of alpha-chloroacrylic acid are obtained by the interaction of formaldehyde, trichloroethylene and a lower aliphatic alcohol in the presence of sulphuric acid, by a process which includes the steps of adding concurrently to a mixture of trichloroethylene and sulphuric acid of at least 80% strength at reaction temperature both formaldehyde or a polymer thereof and a substantial proportion of the alcohol, and subsequently subjecting the reaction mixture to a temperature of at least 80° C., and preferably at least 120° C. in the presence of the remainder of the alcohol, and of an amount of water between 0.1 and 1.0 times the weight of the sulphuric acid.

By this method improved yields of ester are obtained in a shorter time than when all of the alcohol is added subsequent to the reaction of the formaldehyde with the trichloroethylene.

By a lower aliphatic alcohol is meant methyl, ethyl, propyl, or isopropyl alcohols, and by a substantial proportion of the alcohol between 30% and 70% of all that is to be added. Advantageously between 40% and 60% of the alcohol is added with the formaldehyde. It is desirable to use a considerable excess of the alcohol over that theoretically required to esterify the alpha-chloroacrylic acid, and suitably about 2 mols. of alcohol per mol. of trichloroethylene are used. Thus, in the preferred form of the invention, about 1 mol. will be added concurrently with the formaldehyde, and the remainder subsequently.

The formaldehyde is advantageously added as formalin, but it may be added as a suspension of paraformaldehyde in water; alternatively, aqueous sulphuric acid (but not acid of less than 80% strength) may be mixed with the trichloroethylene and powdered formaldehyde added dry or as a suspension in the alcohol, or gaseous formaldehyde may be bubbled through the sulphuric acid-trichloroethylene while the first part of the alcohol is added. In any event, there should be sufficient acid present to prevent the ratio of 100% sulphuric acid to water falling below 4:1 during the interaction between the formaldehyde and the trichloroethylene, and on account of the alcohol added at the same time as the formaldehyde I find it preferable to keep this ratio at approximately 5:1.

In one form of my invention a mixture of trichloroethylene with concentrated sulphuric acid in amounts between 3.5 and 4 mols. per mol. of trichloroethylene, and a small amount of an anti-polymerisation catalyst such as copper carbonate, are stirred vigorously and heated to an elevated temperature, e. g. to 70° C. Lower temperatures down to 30° may, however, be used also. A mixture of methanol and 40% formalin containing 1 mol. of the former and between 0.8 and 0.9 mol. of HCHO per mol. of the trichloroethylene is added while continuing the stirring at such a rate that the temperature of the reaction mixture is automatically maintained; alternatively, methanol and formalin in the same amounts may be added separately but concurrently, the relative rates of addition being such that the two additions are completed at about the same time. A further mol. of methanol is then added and the temperature raised to between 80° C. and 90° C. and finally to about 100° C. until refluxing ceases and esterification is complete. The mixture is then submitted to steam distillation and the ester separated from the distillate and dried. Alternatively, the mixture may be submitted to direct distillation to recover the ester, and further quantities of water, not more than will make the ratio of 100% acid to water more than 1:1 (by weight), may be added; when the formaldehyde has been added as formalin, no advantage arises from so doing, but such additions are of advantage in repressing charring when, for example, dry paraformaldehyde is used with the addition of less or no water. During the distillation step, whether steam distillation or not, high temperatures in excess of 120° C., e. g. 120–140° C., are attained which are beneficial for the best yields. Instead of recovering the ester by distillation, the reaction mixture after the second addition of the alcohol could be heated gradually to above 120° C. for a time, e. g. between 130° and 140°, and the ester subsequently recovered by extraction with a solvent, or by drowning the mixture in a large volume of water, and separating the ester layer.

I find that during the steam distillation frothing is liable to occur, which may be repressed to a considerable degree by adding a small amount of an oil immediately before the distillation. Such oils as castor oil, cotton seed oil, and heavy petroleum hydrocarbon fractions may be used for this purpose.

The following example illustrates but does not limit my invention, all parts being by weight:

Example

In a vessel fitted with a stirrer, a reflux condenser, a thermometer, and means for introducing methanol and formalin in a slow stream, were introduced 656 parts of trichloroethylene, 1840 parts of 98% sulphuric acid and 8 parts of copper carbonate. The mixture was vigorously stirred and heated to 70° C.; 360 parts of 40% (wt./vol.) formalin and 158 parts of methanol were then slowly added so that the temperature of the reaction mixture was kept approximately at 70° C. and so that the two additions were completed at the same time. In the particular conditions under which the run was carried out it was found that this was achieved by adding the formalin at the rate of 3.6 parts per minute and the methanol at the rate of 1.58 parts per minute.

The temperature of the reaction mixture was then raised to 90° C. and a further 158 parts of methanol were added slowly. Finally the temperature was raised to 100° C. and the reaction mixture was kept at this temperature for an hour. 0.5 part of castor oil was then added to the reaction mixture and steam distillation of the ester was commenced. Ester began to distil over when the vapour temperature was 110° C. and was continued until no oily layer separated from the distillate; about 1 part of hydroquinone was put into the receiver to stabilize the product. The monomer was then separated from the upper aqueous layer and dried over calcium chloride; 552 parts of crude product containing 440 parts of the pure methyl alpha-chloroacrylate were thus obtained and were purified by fractionation. The ester in the crude product thus corresponded to a 73% yield calculated on the trichloroethylene, or 83% calculated on the formaldehyde.

By connecting the receiver for the distilled monomer to a second receiver maintained at about —50° C., the majority of the excess methanol used could be recovered as dimethyl ether.

I claim:

1. In a process for the manufacture of lower alkyl esters of alpha-chloroacrylic acid by the interaction of formaldehyde, trichloroethylene and a lower aliphatic alcohol in the presence of sulphuric acid, the steps of concurrently adding a substantial proportion of the alcohol and a substance selected from the group consisting of formaldehyde and its polymers to a mixture at reaction temperature of trichloroethylene with sufficient sulphuric acid to maintain the concentration of the latter above 80% strength during such addition, and subsequently subjecting the reaction mixture to a temperature of at least 80° C. in the presence of the remainder of the alcohol and of an amount of water between 0.1 to 1.0 times the weight of the sulphuric acid.

2. In a process for the manufacture of lower alkyl esters of alpha-chloroacrylic acid by the interaction of formaldehyde, trichloroethylene, and a lower aliphatic alcohol in the presence of sulphuric acid, the steps of concurrently adding between 40% and 60% of the alcohol and a substance selected from the group consisting of formaldehyde and its polymers to a mixture at reaction temperature of trichloroethylene with sufficient sulphuric acid to maintain the concentration of the latter above 80% strength during such addition, and subsequently subjecting the reaction mixture to a temperature of at least 80° C. in the presence of the remainder of the alcohol and an amount of water between 0.1 to 1.0 times the weight of the sulphuric acid.

3. A process according to claim 1 in which the total amount of alcohol added is approximately 2 mols. per mol. of tricholoethylene.

4. A process according to claim 2 in which the total amount of alcohol added is approximately 2 mols. per mol. of trichloroethylene.

5. In a process for the manufacture of lower alkyl esters of alpha-chloroacrylic acid by the interaction of formaldehyde, trichloroethylene and a lower aliphatic alcohol in the presence of sulphuric acid, the steps of concurrently adding formalin and a substantial proportion of the alcohol to a mixture at reaction temperature of trichloroethylene with sufficient concentrated sulphuric acid to maintain the concentration thereof above 80% strength during such addition, adding the remainder of the alcohol, heating to above 80° C. to complete esterification of the alcohol, distilling the reaction mixture, and collecting the alpha-chloroacrylic acid ester fraction.

6. In a process for the manufacture of lower alkyl esters of alpha-chloroacrylic acid by the interaction of formaldehyde, trichloroethylene and a lower aliphatic alcohol in the presence of sulphuric acid, the steps of concurrently adding formalin and between 40% and 60% of the alcohol to a mixture at reaction temperature of trichloroethylene with sufficient concentrated sulphuric acid to maintain the concentration thereof above 80% strength during such addition, adding the remainder of the alcohol, heating to above 80° C. to complete esterification of the alcohol, distilling the reaction mixture, and collecting the alpha-chloroacrylic acid ester fraction.

7. A process according to claim 5 in which the total amount of alcohol added is approximately 2 mols. per mol. of trichloroethylene.

8. A process according to claim 6 in which the total amount of alcohol added is approximately 2 mols. per mol. of trichloroethylene.

9. In a process for the manufacture of lower alkyl esters of alpha-chloroacrylic acid by the interaction of formaldehyde, trichloroethylene, and a lower aliphatic alcohol in the presence of sulphuric acid, the steps of concurrently adding formalin and a substantial proportion of the alcohol to a mixture at reaction temperature of trichloroethylene with sufficient concentrated sulphuric acid to maintain the concentration thereof above 80% strength during such addition, adding the remainder of the alcohol, heating to above 80° C. to complete esterification of the alcohol, submitting the reaction mixture to steam distillation, and separating the alpha-chloroacrylic acid ester from the distillate.

10. In a process for the manufacture of methyl alpha-chloroacrylate by the interaction of formaldehyde, trichloroethylene, and methyl alcohol in the presence of sufficient concentrated sulphuric acid, the steps of concurrently adding a substantial proportion of the alcohol and a substance selected from the group consisting of formaldehyde and its polymers to a mixture at reaction temperature of trichloroethylene with sufficient sulphuric acid to maintain the concentration of the latter above 80% strength during such addition, and subsequently subjecting the reaction mixture to a temperature of at least 80° C. in the presence of the remainder of the alcohol and an amount of water between 0.1 and 1.0 time the weight of the sulphuric acid.

11. In a process for the manufacture of methyl alpha-chloroacrylate by the interaction of formaldehyde, trichloroethylene and methyl alcohol, the steps of concurrently adding formalin and a substantial proportion of the alcohol to a mixture at reaction temperature of the trichloroethylene with sufficient concentrated sulphuric acid to maintain the concentration thereof above 80% strength during such addition, adding the remainder of the alcohol, heating to above 80° C. to complete esterification of the alcohol, distilling the reaction mixture, and collecting the alpha-chloroacrylic acid ester fraction.

12. In a process for the manufacture of methyl alpha-chloroacrylate by the interaction of formaldehyde, trichloroethylene, and methyl alcohol, the steps of concurrently adding 1 mol. of methyl alcohol and 0.8 to 0.9 mol. of formalin to a mixture of 1 mol. of trichloroethylene with between 3.5 and 4 mols. of concentrated sulphuric acid while maintaining the reaction mixture at approximately 70° C., adding a further mol. of methyl alcohol, heating under reflux to 80° C. until refluxing ceases, and steam distilling the reaction mixture.

ALEXANDER MILLER ROBERTS.